United States Patent
Ji et al.

(10) Patent No.: US 12,422,707 B2
(45) Date of Patent: Sep. 23, 2025

(54) DISPLAY DEVICE THAT PREVENTS THE VEHICLE-MOUNTED DISPLAY SCREEN FROM AFFECTING THE MAIN DRIVER

(71) Applicant: HKC CORPORATION LIMITED, Shenzhen (CN)

(72) Inventors: Guofei Ji, Shenzhen (CN); Shilin Lv, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/814,397

(22) Filed: Aug. 23, 2024

(65) Prior Publication Data
US 2025/0076693 A1    Mar. 6, 2025

(30) Foreign Application Priority Data
Sep. 1, 2023    (CN) .......................... 202311117837.X

(51) Int. Cl.
G02F 1/13         (2006.01)
G02F 1/13357      (2006.01)

(52) U.S. Cl.
CPC ...... *G02F 1/1323* (2013.01); *G02F 1/133603* (2013.01); *G02F 1/133608* (2013.01)

(58) Field of Classification Search
CPC ............. G02F 1/1323; G02F 1/133603; G02F 1/133608
See application file for complete search history.

(56) References Cited

U.S. PATENT DOCUMENTS

| | | | |
|---|---|---|---|
| 11,280,954 B2 * | 3/2022 | Pan | G02B 6/0055 |
| 12,147,099 B2 * | 11/2024 | Wang | G02F 1/1323 |
| 2002/0158967 A1 | 10/2002 | Janick et al. | |
| 2020/0050032 A1 * | 2/2020 | Chen | G02F 1/133606 |
| 2020/0124934 A1 | 4/2020 | Noma | |
| 2020/0379162 A1 * | 12/2020 | Chen | G02B 6/0053 |
| 2023/0152614 A1 * | 5/2023 | He | G02F 1/1334 |
| | | | 349/62 |
| 2024/0176130 A1 * | 5/2024 | Yang | H01F 7/126 |

(Continued)

FOREIGN PATENT DOCUMENTS

| | | |
|---|---|---|
| CN | 110082836 A | 8/2019 |
| CN | 211653340 U | 10/2020 |
| CN | 213634038 U | 7/2021 |

(Continued)

*Primary Examiner* — Tracie Y Green

(57) ABSTRACT

A display device is disclosed. The display device includes a backlight module, a display panel, and a second viewing angle control layer. The backlight module includes: a back plate; a first light plate, where a hollowed region is defined in a center of the first light plate; a first viewing angle control layer disposed on the first light plate and including multiple first grid lines; and a rotating assembly, disposed in the hollowed region and configured to control the first viewing angle control layer to rotate in a direction parallel to a plane in which the display panel lies. The second viewing angle control layer is arranged on the first viewing angle control layer, and includes multiple second grid lines. An orthogonal projection of the second viewing angle control layer on the bottom plate overlaps an orthogonal projection of the first viewing angle control layer on the bottom plate.

20 Claims, 3 Drawing Sheets

(56) References Cited

U.S. PATENT DOCUMENTS

2024/0329458 A1* 10/2024 Wen .................. G02F 1/1335

FOREIGN PATENT DOCUMENTS

| CN | 113281926 A | 8/2021 |
| CN | 115327820 A | 11/2022 |
| CN | 116300208 A | 6/2023 |
| JP | 2020091337 A | 6/2020 |

* cited by examiner

DISPLAY DEVICE THAT PREVENTS THE VEHICLE-MOUNTED DISPLAY SCREEN FROM AFFECTING THE MAIN DRIVER

CROSS-REFERENCE TO RELATED APPLICATIONS

This application claims the priority and benefit of Chinese patent application number 202311117837X, titled "Display Device" and filed Sep. 1, 2023 with China National Intellectual Property Administration, the entire contents of which are incorporated herein by reference.

TECHNICAL FIELD

This application relates to the field of display technology, and more particularly relates to a display device.

BACKGROUND

The description provided in this section is intended for the mere purpose of providing background information related to the present application but doesn't necessarily constitute prior art.

A liquid-crystal display (LCD) includes a backlight module and a liquid-crystal panel. The light emitted by the backlight module is projected on the liquid-crystal panel to realize the display function. The backlight module of a direct-lit LCD display includes multiple light sources that can independently adjust their brightness, so it has a desirable display effect and is widely used in display terminals such as mobile phones, tablet computers, and vehicle-mounted displays.

In current vehicle-mounted displays, in order to prevent reflection problems from affecting driving vision, the display screen may be designed to be anti-peeping in the up and down orientation to narrow the up and down viewing angles. However, when the co-pilot entertainment mode is selected and enabled on the display screen, the content displayed on the display screen may still affect the main driver. Therefore, how to prevent the content shown on the display screen from affecting the main driver is also an important direction of safety design.

SUMMARY

It is therefore one purpose of this application to provide a display device to prevent the vehicle-mounted display screen from affecting the main driver.

This application discloses a display device. The display device includes a backlight module and a display panel. The backlight module provides backlight for the display panel. The backlight module includes a back plate, a first light plate, a first viewing angle control layer, and a rotating assembly. The back plate includes a bottom plate. The first light plate is disposed on the bottom plate. The first light plate includes a plurality of first light-emitting elements. A hollowed region is defined in a center of the first light plate. The first viewing angle control layer is arranged on a side of the first light plate facing away from the bottom plate. The first viewing angle control layer includes a plurality of first grid lines sequentially arranged along a first orientation. The rotating assembly is arranged in the hollowed region. One end of the rotating assembly is connected to the bottom plate. The other end of the rotating assembly is connected to the first viewing angle control layer to control the first viewing angle control layer to rotate in a direction parallel to a plane in which the display panel lies.

The display device further includes a second viewing angle control layer. The second viewing angle control layer is arranged on the side of the first viewing angle control layer facing away from the bottom plate. The second viewing angle control layer includes a plurality of second grid lines sequentially arranged along a second orientation. An orthogonal projection of the second viewing angle control layer on the bottom plate overlaps an orthogonal projection of the first viewing angle control layer on the bottom plate.

In some embodiments, the backlight module further includes a sealant frame, which is disposed on an edge of the bottom plate. The second viewing angle control layer is fixed onto the sealant frame.

In some embodiments, the second viewing angle control layer is fixed onto the side of the display panel facing the backlight module. Alternatively, the second viewing angle control layer is fixed on the side of the display panel facing away from the backlight module. Alternatively, the second viewing angle control layer is disposed inside the display panel.

In some embodiments, the rotating assembly includes a motor and a second light plate. One end of the motor is fixed onto the bottom plate. The other end of the motor is a rotating shaft. The rotating shaft is arranged perpendicular to the bottom plate and is connected with the second light plate to control the rotation of the second light plate in a direction parallel to the plane in which the display panel lies. The first viewing angle control layer is fixed onto the second light plate.

In some embodiments, the first viewing angle control layer is arranged on the side of the second light plate facing the display panel, opposite to a plurality of second light-emitting elements disposed on the second light plate. The first viewing angle control layer is fixed onto the second light plate through an optical glue. The optical glue is disposed both in the gap between every two adjacent second light-emitting elements and on the side of each of the plurality of second light-emitting elements facing away from the bottom plate.

In some embodiments, a groove corresponding to the hollowed region is defined in the bottom plate. The motor is disposed inside the groove. The first light plate is flush with the second light plate.

In some embodiments, a first reflective layer is disposed at a bottom of the groove. A second reflective layer is disposed on the side of each of the plurality of first grid lines facing the second light plate.

In some embodiments, the cross-sections of the hollowed region and the second light plate along a plane parallel to the first light plate both have a circular shape. The first viewing angle control layer has a square cross-section along a plane parallel to the first light plate.

In some embodiments, an area of the second viewing angle control layer is not less than an area of the display area of the display panel. An area of the first viewing angle control layer is less than or equal to an area of the second viewing angle control layer.

In some embodiments, the length of each sub-pixel in the display panel is equal to a width of the sub-pixel. Furthermore, the spacing between adjacent first grid lines is equal to the spacing between adjacent second grid lines, and both are equal to the length of each sub-pixel, or equal to the sum of the widths of a number of n sub-pixels and the widths of a number of (n−1) first grid lines, where n is a natural number greater than or equal to 2.

In this application, two overlapping anti-peep layers are disposed in the display device, namely a first viewing angle control layer and a second viewing angle control layer, and the grid lines in the first viewing angle control layer and the second viewing angle control layer are both strip-shaped structures that are parallel to each other. The rotation assembly may be manipulated to control the first viewing angle control layer to rotate. When it is needed to switch to the sharing mode, the first viewing angle control layer may be controlled to rotate until the first grid lines and the second grid lines are parallel to each other. In this case, both the first viewing angle control layer and the second viewing angle control layer can only achieve the anti-peeping effect on the same two sides. In this way, the display device can only achieve anti-peeping on both sides and narrow the viewing angles in the up and down orientation. When it is needed to switch to anti-peep mode, the first viewing angle control layer may be controlled to rotate so that the first grid lines and the second grid lines are perpendicular to each other. In this case, the first viewing angle control layer and the second viewing angle control layer may each achieve an anti-peeping effect on two different sides. In this way, the display device can prevent peeping on all four sides and further narrow the viewing angles in the left and right orientation to prevent the display content from affecting the main driver when the co-pilot entertainment mode is selected, thereby ensuring driving safety.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
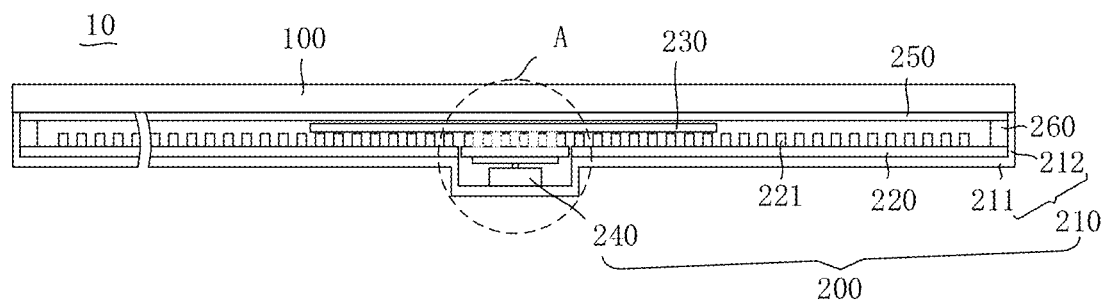
FIG. 1 is a schematic diagram of a display device provided by an embodiment of this application.

In the drawings: 10. Display device; 100. Display panel; 200. Backlight module; 210. Back plate; 211. Bottom plate; 212. Side plate; 213. Groove; 214. First reflective layer; 220. First light plate; 221. First light-emitting element; 222. Hollowed region; 230. First viewing angle control layer; 231. First grid line; 232. Second reflective layer; 240. Rotating assembly; 241. Motor; 242. Rotating shaft; 243. Second light plate; 244. Second light-emitting element; 250. Second viewing angle control layer; 251. Second grid line; 260. Sealant frame.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

Furthermore, as used herein, terms "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

FIG. 1 is a schematic diagram of a display device provided by an embodiment of this application. As illustrated in FIG. 1, this embodiment of the application provides a display device 10. The display device 10 uses mini LED (Light Emitting Diode) display technology or Micro LED (Micro Light Emitting Diode) display technology for display.

The display device 10 includes a backlight module 200 and a display panel 100. The backlight module 200 provides backlight for the display panel 100. The backlight module 200 includes a back plate 210, a first light plate 220, a first viewing angle control layer 230, and a rotating assembly 240. The back plate 210 includes a bottom plate 211 and a side plate 212. The side plate 212 is arranged around an edge of the bottom plate 211. The first light plate 220 is arranged in the area surrounded by the side plate 212, and is fixed onto the bottom plate 211 through double-sided tape or screws. A plurality of first light-emitting elements 221 are arranged in an array on the first light plate 220. A hollowed region 222 is defined in a center of the first light plate 220, and the bottom plate 211 under the first light plate 220 is exposed through the hollowed region 222.

The first viewing angle control layer 230 is disposed on the side of the first light plate 220 facing away from the bottom plate 211. The first viewing angle control layer 230 includes a plurality of first grid lines 231 sequentially arranged along a first orientation. The rotating assembly 240 is disposed in the hollowed region 222 and does not interfere with the first light plate 220. One end of the rotating assembly 240 is connected to the bottom plate 211. The other end of the rotating assembly 240 is connected to the first viewing angle control layer 230 to control the first viewing angle control layer 230 to rotate in a direction parallel to a plane in which the display panel 100 is located.

The display device 10 further includes a second viewing angle control layer 250. The second viewing angle control layer 250 is disposed on the side of the first viewing angle control layer 230 facing away from the bottom plate 211. The second viewing angle control layer 250 includes a plurality of second grid lines 251 sequentially arranged along a second orientation. An orthogonal projection of the second viewing angle control layer 250 on the bottom plate 211 overlaps an orthogonal projection of the first viewing angle control layer 230 on the bottom plate 211.

It should be noted that when it is needed to control the display device 10 to be in sharing mode, the first orientation and second orientation should be the same. When it is needed to control the display device 10 to be in anti-peeping mode, the first orientation and second orientation should be perpendicular. The first orientation is the up and down orientation of the display device 10, namely the orientation pointing from the upside to the downside or vice versa, and the second orientation is the left and right orientation of the display device 10, namely the orientation pointing from the left side to the right side or vice versa. Of course, the details may be adjusted depending on the actual situation.

It should be noted that the rotating assembly 240 may have only two rotational gears, such as 0 degrees and 90 degrees. When the 0 degree gear is selected, the first viewing angle control layer 230 may not rotate, or the first viewing angle control layer 230 may be controlled to rotate back to the initial angle so that the first grid line 231 and the second grid line 251 are parallel to each other. At this time, the display device 10 is in sharing mode. When the 90-degree gear is selected, the first viewing angle control layer 230 rotates 90 degrees so that the first grid line 231 and the second grid line 251 are perpendicular to each other. At this time, the display device 10 is in anti-peeping mode. Of course, the gears of the rotating assembly 240 may also be designed to be in other forms as needed. Alternatively, when the first viewing angle control layer 230 is rotated to other angles, the first grid line 231 and the second grid line 251 may tilted relative to each other, and the design may be specifically based on the actual situation.

In this application, two overlapping anti-peeping layers are disposed in the display device 10, namely the first viewing angle control layer 230 and the second viewing angle control layer 250, and further the grids in the first viewing angle control layer 230 and the second viewing angle control layer 250 are both parallel strip structures. When used separately, they can realize the anti-peeping effect for both sides of the display screen. The rotating assembly 240 may be manipulated to control the first viewing angle control layer 230 to rotate, thereby achieving the viewing angle switching mode.

Figure 2:
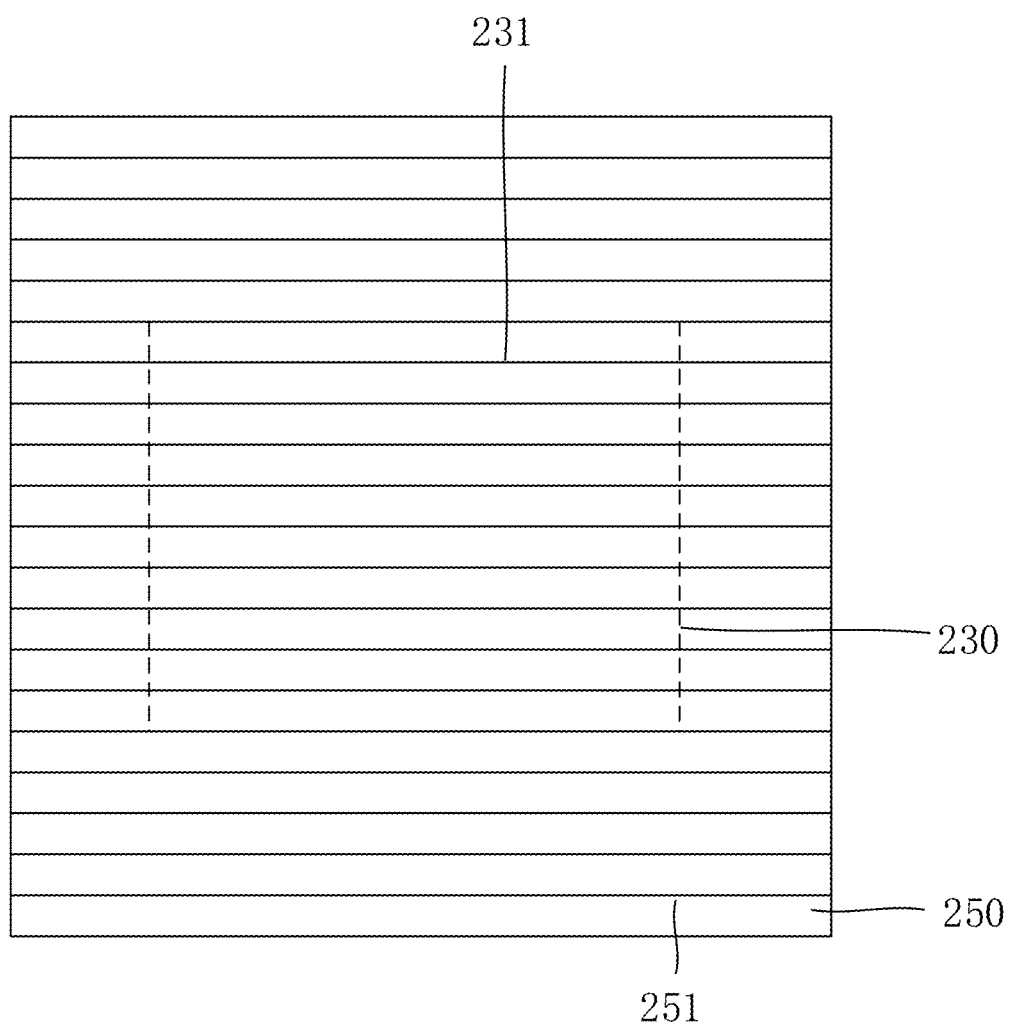
FIG. 2 is a schematic plan view of a first viewing angle control layer and a second viewing angle control layer in sharing mode.
Figure 3:
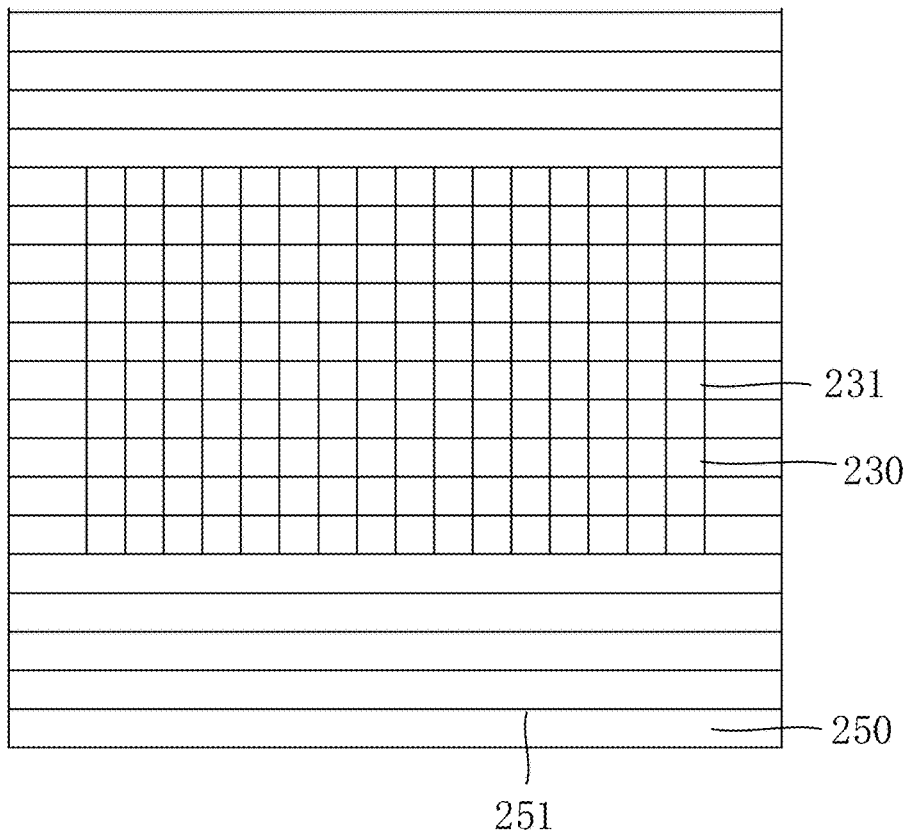
FIG. 3 is a schematic plan view of a first viewing angle control layer and a second viewing angle control layer in anti-peeping mode.

FIG. 2 is a schematic plan view of a first viewing angle control layer and a second viewing angle control layer in sharing mode. FIG. 3 is a schematic plan view of a first viewing angle control layer and a second viewing angle control layer in anti-peeping mode. As illustrated in FIG. 2 and FIG. 3, when it is needed to switch to the sharing mode, the first viewing angle control layer 230 may be controlled to rotate until the first grid line 231 and the second grid line 251 are parallel. At this time, both the first viewing angle control layer 230 and the second viewing angle control layer 250 may only achieve the anti-peeping effect on the same two sides, so that the display device 10 can only achieve anti-peeping on two sides. When it is needed to switch to the anti-peeping mode, the first viewing angle control layer 230 may be controlled to rotate until the first grid line 231 and the second grid line 251 are perpendicular to each other. At this time, the first viewing angle control layer 230 and the second viewing angle control layer 250 may each achieve anti-peeping effect on two different sides, so that the display device 10 can achieve anti-peeping on four sides, preventing the display content shown on the display screen from affecting the main driver when the co-pilot entertainment mode is selected, thereby ensuring driving safety.

It is understandable that the display device 10 in this application is not only suitable for vehicle display, but also for the display of other products such as mobile phones and computers.

In embodiments of this application, when switching to the sharing mode, the first grid line 231 in the first viewing angle control layer 230 is oriented vertically, and the second grid line 251 in the second viewing angle control layer 250 is also oriented vertically. Both the first viewing angle control layer 230 and the second viewing angle control layer 250 may only achieve anti-peeping in the up and down orientation to narrow the viewing angle in the up and down orientation. In this case, in the vehicle-mounted display, it can prevent reflection problems from affecting driving vision. Furthermore, in this case, both the main driver and the co-pilot can see the content shown on the display panel 100, realizing content sharing. When switching to the anti-peeping mode, the first grid line 231 in the first viewing angle control layer 230 is oriented vertically, and so still prevents peeping in the up and down orientation. The second grid line 251 in the second viewing angle control layer 250 is oriented horizontally to prevent peeping in the left and right orientation and narrow the viewing angle in the left and right orientation. In this case, in the overlapping area between the second viewing angle control layer 250 and the first viewing angle control layer 230, the main driver cannot see the content shown in the overlapping area, which can only be seen from the co-pilot, thereby preventing the displayed content from affecting the main driver when the co-pilot selects entertainment mode in this overlapping area.

In order to prevent the light transmittance of the display panel 100 from decreasing due to the design of the two layers of anti-peep films and avoid the difference in display brightness between the area of the second viewing angle control layer 250 that overlaps the first viewing angle control layer 230 and the area of the second viewing angle control layer 250 that does not overlap the first viewing angle control layer 230, in the embodiments of this application, the brightness difference between the two areas and the corresponding compensation current are calculated during the test phase, and current compensation is performed on part of the first light-emitting elements 221 on the first light plate 220 to make the overall display brightness of the display panel 100 uniform.

In an embodiment of this application, the backlight module 200 further includes a sealant frame 260. The sealant frame 260 may be arranged on the edge of the bottom plate 211 and attached to the side plate 212. The second viewing angle control layer 250 may be fixed onto the sealant frame 260. The display panel 100 may be directly attached to the second viewing angle control layer 250. Alternatively, the top of the sealant frame 260 may also be designed as a stepped shape, the display panel 100 may be fixed onto an upper step surface of the sealant frame 260, and the second viewing angle control layer 250 may be fixed onto a lower step surface of the sealant frame 260, so that the display panel 100 and the second viewing angle control layer 250 do not fit together.

In this solution, both the first viewing angle control layer 230 and the second viewing angle control layer 250 are located between the bottom plate 211 and the display panel 100. The distance between the first viewing angle control layer 230 and the second viewing angle control layer 250 is relatively small. The light emitted by the light-emitting elements will not be easily scattered and mixed after passing through the first viewing angle control layer 230. Therefore, the anti-peep effect of the first viewing angle control layer 230 can be effectively guaranteed, and so the anti-peep effect of the display device 10 can be ensured.

Of course, the backlight module 200 may further have structures such as optical films. The optical films may be stacked on the second viewing angle control layer 250 and bonded therewith with an optical glue.

Figure 4:
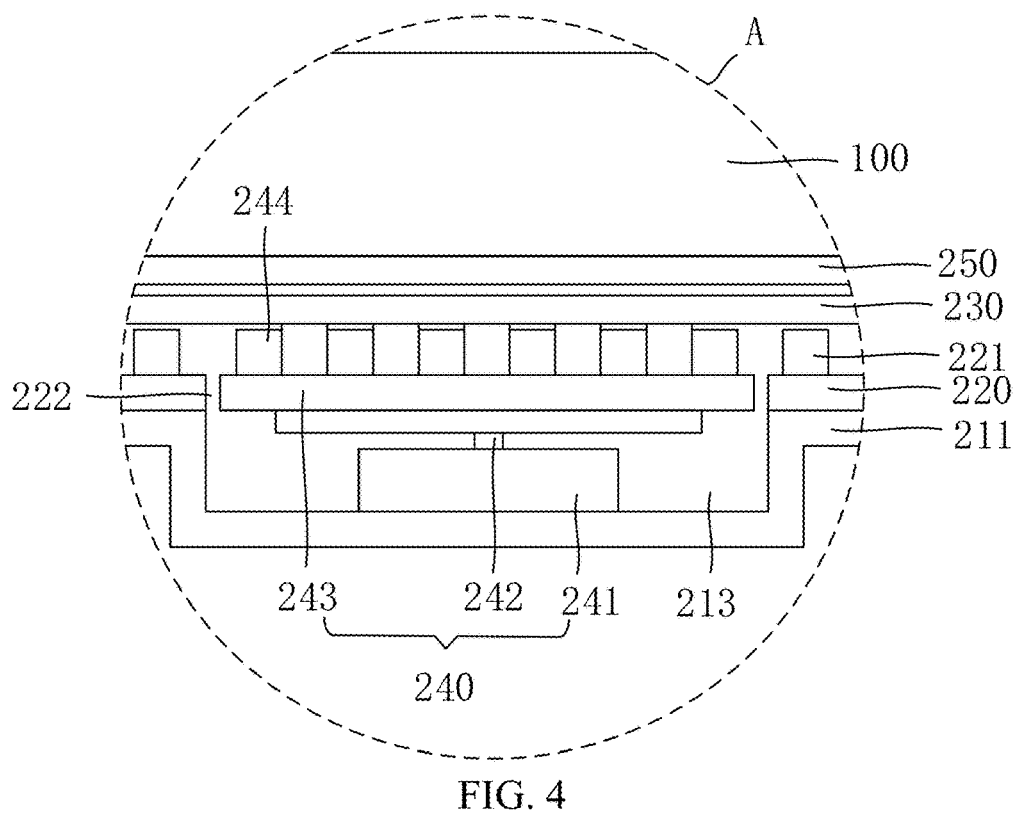
FIG. 4 is a partial enlarged view of portion A shown in FIG. 1.

FIG. 4 is a partial enlarged view of portion A shown in FIG. 1. As illustrated in FIG. 4, in an embodiment of this application, the rotating assembly 240 includes a motor 241 and a second light plate 243. The motor 241 may be a micro servo motor 241. The housing of the motor 241 may be fixed onto the bottom plate 211 by bonding, snap-fitting, etc. Holes may be punched in the bottom plate 211, and wiring may be used to connect the driving circuitry and the motor 241 together to control the motor 241, thereby realizing the switching of the anti-peeping mode. The rotating shaft 242 of the motor 241 faces upward, is arranged perpendicularly to the bottom plate 211, and is connected to the second light plate 243 to control the rotation of the second light plate 243 in a direction parallel to the plane of the display panel 100. The first viewing angle control layer 230 may be fixed onto the second light plate 243.

Compared with the solution of connecting the motor 241 to the first viewing angle control layer 230 to directly control the rotation of the first viewing angle control layer 230, the embodiment of this application connects the motor 241 to the second light plate 243, and then connects the second light plate 243 to the first viewing angle control layer 230, and control the first viewing angle control layer 230 and the second light plate 243 to rotate simultaneously through the motor 241, so that the first viewing angle control layer 230 and the second light plate 243 are kept in a relatively stationary state, thereby avoiding the problem of abnormal display during the viewing angle switching process when the two rotate relative to each other when switching the anti-peep state. Furthermore, the second light plate 243 supports and fixes the first viewing angle control layer 230, which can also increase the support area and stability of the first viewing angle control layer 230, and can also avoid light and shadow problems below the first viewing angle control layer 230.

Further, in order to avoid the presence of the motor 241 from causing the second light plate 243 to be higher than the first light plate 220 resulting in different optical distances between the first light plate 220 and the second light plate 243 thus affecting the display effect. The following structure is used. In an embodiment of this application, a groove 213 corresponding to the hollowed region 222 is defined in the bottom plate 211. The motor 241 is arranged in the groove 213, and the first light plate 220 is flush with the second light plate 243, so that the light-emitting elements on the first light plate 220 and those on the second light plate 243 emit light with the same effect, improving the light-emitting uniformity of the display panel 100.

Furthermore, both the first light-emitting element 221 and the second light-emitting element 244 may use the same model and specifications. The way of arrangement of the first light-emitting element 221 on the first light plate 220 may be consistent with the way of arrangement of the second light-emitting element 244 on the second light plate 243.

Figure 5:
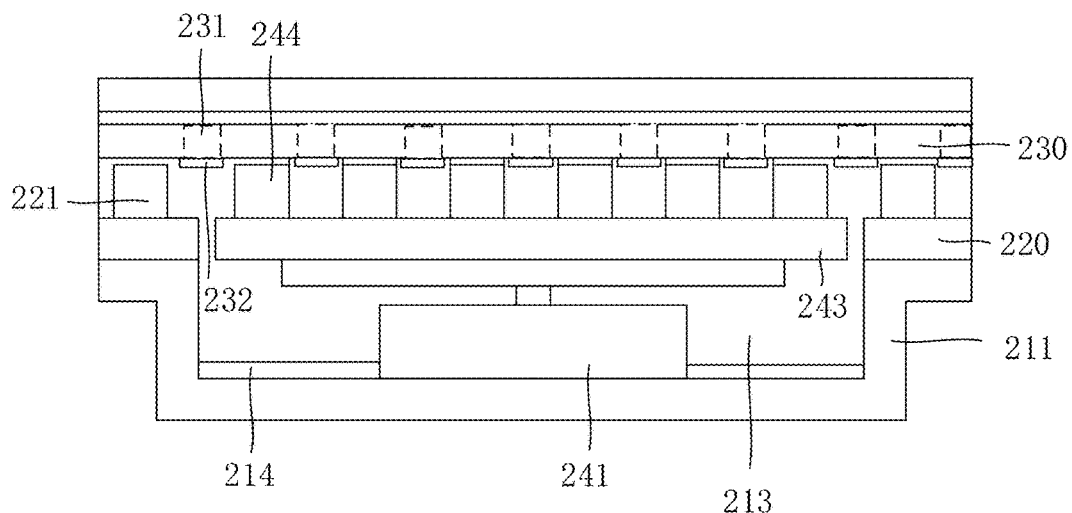
FIG. 5 is a partial schematic diagram of a backlight module provided by an embodiment of this application.

Further, as illustrated in FIG. 5, since the second light plate 243 is flush with the first light plate 220, in order to prevent the second light plate 243 from touching the first light plate 220 during rotation, there may be a certain distance between the first light plate 220 and the second light plate 243. In the embodiments of this application, a first reflective layer 214 may be disposed at the bottom of the groove 213, and a second reflective layer 232 may be disposed on the side of the first grid line 231 facing towards the second light plate 243. After the light emitted by the first light-emitting element 221 and the second light-emitting element 244 irradiates the second reflective layer 232, it is reflected from the second reflective layer 232 to the first reflective layer 214, and finally reflected back from the first reflective layer 214, so that the gap between the first light plate 220 and the second light plate 243 may also emit light, thereby solving the shadow problem between the first light plate 220 and the second light plate 243.

As for the specific design of the first reflective layer 214 and the second reflective layer 232, they may be reflective coatings, reflective tapes, or other materials and structures, which will not be described in detail here.

Figure 6:
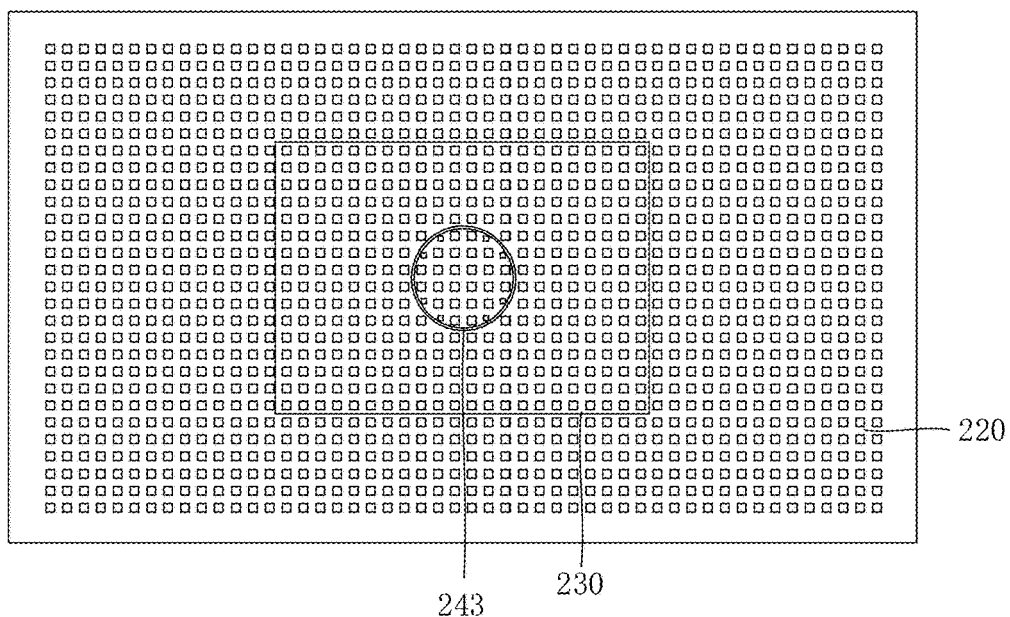
FIG. 6 is a top view of a backlight module provided by an embodiment of this application.

Furthermore, as illustrated in FIG. 4 and FIG. 6, which is a top view of a backlight module. In an embodiment of this application, the cross-sections of the hollowed region 222 and the second light plate 243 along a plane parallel to the first light plate 220 are both circular. In this case, during the rotation of the second light plate 243, the same distance is always kept between the edge of the second light plate 243 and the first light plate 220. They will not interfere with each other, nor will a local spacing be too large, thus maintaining display stability.

Furthermore, the surface area of the first viewing angle control layer 230 is larger than the surface area of the second light plate 243. In this case, while ensuring that the first viewing angle control layer 230 and the second viewing angle control layer 250 have a relatively large overlapping area and an anti-peeping display area on four sides, the motor 241 can also be prevented from being subjected to excessive bearing load, thereby effectively protecting the service life of the motor 241.

Furthermore, the area of the second viewing angle control layer 250 is not less than the area of the display area in the display panel 100, the area of the first viewing angle control layer 230 is less than or equal to the area of the second viewing angle control layer 250. Furthermore, the cross section of the first viewing angle control layer 230 along a plane parallel to the first light plate 220 may be square. Compared with making the first viewing angle control layer 230 into other patterns or shapes, after the first viewing angle control layer 230 is made into a square shape, no matter what display mode the display device 10 is switched to, the edge of the first viewing angle control layer 230 will not overlap the pixels, so that the aperture ratio of the display panel 100 will not be affected. Furthermore, when the area of the first viewing angle control layer 230 is smaller than the area of the second viewing angle control layer 250, the display panel 100 can narrow the upper and lower viewing angles of the full screen and narrow the viewing angles of both sides of the partial screen. When the area of the first viewing angle control layer 230 is equal to the area of the second viewing angle control layer 250, the display panel 100 can narrow the upper and lower viewing angles of the full screen and narrow the viewing angles of both sides of the full screen.

Further, in an embodiment of this application, the length of each sub-pixel in the display panel 100 is equal to a width of the sub-pixel. Furthermore, the spacing between adjacent first grid lines 231 is equal to the spacing between adjacent second grid lines 251, and both are equal to the length of each sub-pixel. Or, the spacing between adjacent first grid lines 231 is equal to the spacing between adjacent second grid lines 251, and both are equal to the sum of the width of n sub-pixels and the width of (n−1) first grid lines 231 (or second grid lines 251), where n is a natural number greater than or equal to 2. In this case, no matter what display mode the display device 10 is switched to, each first grid line 231 and each second grid line 251 are located between adjacent sub-pixels and overlap with the black matrix between adjacent sub-pixels, and will not overlap with the image.

Therefore, the aperture ratio of the display panel 100 will not be affected, and moiré patterns will not be generated, thus effectively ensuring the display quality. Therefore, the aperture ratio of the display panel 100 will not be affected, and moiré patterns will not be generated, thus effectively ensuring the display quality.

In addition, in embodiments of this application, the first viewing angle control layer 230 is disposed on the side of the second light plate 243 facing the display panel 100, and is disposed opposite to the second light-emitting elements 244 on the second light plate 243. The central axes of the first viewing angle control layer 230 and the second light plate 243 coincide with each other to ensure their stability during rotation.

The first viewing angle control layer 230 is fixed onto the second light plate 243 through an optical glue. The optical glue is disposed both in the gap between adjacent second light-emitting elements 244 and on the side of the second light-emitting element 244 facing away from the bottom plate 211. In this case, all the areas in the first viewing angle control layer 230 that overlap with the second light plate 243 are in contact with the optical glue. First, this increases the contact area between the first viewing angle control layer 230 and the second light plate 243 to improve the connection effect. Second, it enables the first viewing angle control layer 230 and the second light-emitting element 244 to be separated by the optical glue thus raising the first viewing angle control layer 230. Since the first light-emitting elements 221 and the second light-emitting elements 244 are located at the same height, the first viewing angle control layer 230 is higher than the second light-emitting elements 244 to prevent the first viewing angle control layer 230 from scratching the second light-emitting elements 244 during the rotation. Third, since the optical glue is in full contact with the first viewing angle control layer 230 in an entire surface and there is no gap between them, it can also avoid the problem of uneven surface of the first viewing angle control layer 230 caused by bubbles and cavities.

In some embodiments, in the embodiments of this application, the position of the second viewing angle control layer 250 may also be changed, and the second viewing angle control layer 250 may be placed on the light incident side of the display panel 100. That is, the second viewing angle control layer 250 may be fixed onto the side of the display panel 100 facing the backlight module 200. Alternatively, the second viewing angle control layer 250 may be placed on the light emitting side of the display panel 100, that is, the second viewing angle control layer 250 may be fixed onto the side of the display panel 100 facing away from the backlight module 200.

In this embodiment, there is no need to change other structures, and switching between the regional anti-peeping mode and the regional sharing mode can also be achieved through the above design. Furthermore, when the second viewing angle control layer 250 is first bonded to the display panel 100, and then the display panel 100 is fixed to the backlight module 200, the assembly efficiency is even higher. Of course, the second viewing angle control layer 250 may also be placed inside the display panel 100 as needed.

Figure 7:
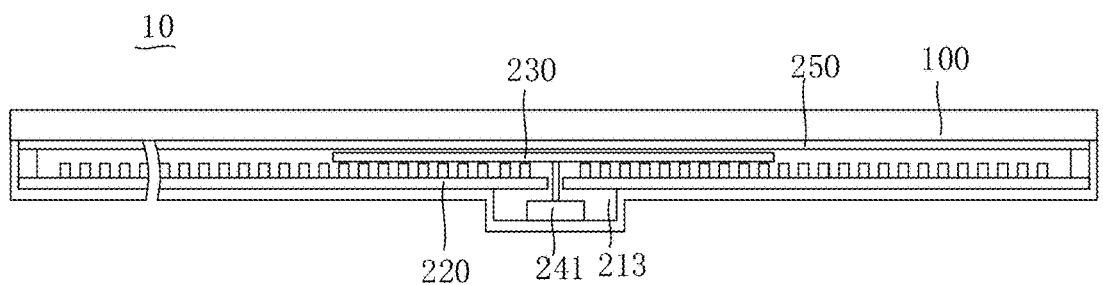
FIG. 7 is a schematic diagram of another display device provided by an embodiment of this application.

In some embodiments, as illustrated in FIG. 7, in the embodiment of this application, the hollowed region 222 may also be directly defined as a small hole, and the rotating shaft 242 of the motor 241 may be directly connected to the first viewing angle control layer 230 through the small hole, driving the first viewing angle control layer 230 to rotate.

In this embodiment, there is no need to add a second light plate 243 in the backlight module 200, which reduces the number of structures in the backlight module 200, which is beneficial to reducing costs.

In some embodiments, in the embodiments of this application, the spacing between adjacent first grid lines 231 may also be set to m times the spacing between adjacent second grid lines 251, where m is a natural number greater than 1. In this case, there is at least one sub-pixel between adjacent first grid lines 231.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A display device, comprising a backlight module and a display panel, the backlight module being configured to provide backlight for the display panel; wherein the backlight module comprises:
    a back plate, comprising a bottom plate;
    a first light plate, disposed on the bottom plate, wherein there is disposed a plurality of first light-emitting elements on the first light plate, and there is defined a hollowed region in a center of the first light plate;
    a first viewing angle control layer, disposed on a side of the first light plate facing away from the bottom plate, wherein the first viewing angle control layer comprises a plurality of first grid lines sequentially arranged along a first orientation; and
    a rotating assembly, arranged in the hollowed region, wherein one end of the rotating assembly is connected to the bottom plate, and another end of the rotating assembly is connected to the first viewing angle control layer to control the first viewing angle control layer to rotate in a direction parallel to a plane in which the display panel lies;
    a second viewing angle control layer, disposed on a side of the first viewing angle control layer facing away from the bottom plate, wherein the second viewing angle control layer comprises a plurality of second grid lines sequentially arranged along a second orientation;
    wherein an orthogonal projection of the second viewing angle control layer on the bottom plate overlaps with an orthogonal projection of the first viewing angle control layer on the bottom plate.

2. The display device as recited in claim 1, wherein the backlight module further comprises a sealant frame, which is arranged on an edge of the bottom plate; wherein the second viewing angle control layer is fixed onto the sealant frame.

3. The display device as recited in claim 1, wherein the second viewing angle control layer is fixed onto a side of the display panel facing the backlight module.

4. The display device as recited in claim 1, wherein the second viewing angle control layer is fixed onto a side of the display panel facing away from the backlight module.

5. The display device as recited in claim 1, wherein the second viewing angle control layer is disposed inside the display panel.

6. The display device as recited in claim 1, wherein the rotating assembly comprises a motor and a second light plate; wherein one end of the motor is fixed onto the bottom plate, and another end of the motor comprises a rotating shaft; wherein the rotating shaft is arranged perpendicular to the bottom plate and is connected to the second light plate and operative to control the second light plate to rotate in a direction parallel to the plane in which the display panel lies; wherein the first viewing angle control layer is fixed onto the second light plate.

7. The display device as recited in claim 6, wherein the first viewing angle control layer is disposed on the side of the second light plate facing the display panel, and is arranged opposite to a plurality of second light-emitting elements disposed on the second light plate.

8. The display device as recited in claim 7, wherein the first viewing angle control layer is fixed onto the second light plate through an optical glue, wherein the optical glue is further disposed both in a gap between every two adjacent second light-emitting elements and on a side of each second light-emitting element facing away from the bottom plate.

9. The display device as recited in claim 7, wherein the plurality of first light-emitting elements are of a same model as the plurality of second light-emitting elements, and wherein an arrangement of the plurality of first light-emitting elements on the first light plate is consistent with an arrangement of the plurality of second light-emitting elements on the second light plate.

10. The display device as recited in claim 6, wherein there is defined in the bottom plate a groove corresponding to the hollowed region, wherein the motor is disposed in the groove, and wherein the first light plate is flush with the second light plate.

11. The display device as recited in claim 10, wherein there is disposed a first reflective layer at a bottom of the groove, and there is disposed a second reflective layer on a side of each of the plurality of first grid lines facing the second light plate.

12. The display device as recited in claim 6, wherein a cross-section of the hollowed region alone a plane parallel to the first light plate and a cross-section of the second light plate along the plane parallel to the first light plate are both circular shaped.

13. The display device as recited in claim 12, wherein a surface area of the first viewing angle control layer is greater than a surface area of the second light plate.

14. The display device as recited in claim 12, wherein a first viewing angle control layer has a square-shaped cross-section along a plane parallel to the first light plate.

15. The display device as recited in claim 6, wherein a central axis of the first viewing angle control layer coincides with a central axis of the second light plate.

16. The display device as recited in claim 1, wherein an area of the second viewing angle control layer is not less than an area of a display area of the display panel; wherein an area of the first viewing angle control layer is less than or equal to an area of the second viewing angle control layer.

17. The display device as recited in claim 1, wherein a length of each sub-pixel in the display panel is equal to a width of the sub-pixel; wherein a spacing between every two adjacent first grid lines is equal to a spacing between every two adjacent second grid lines, and wherein both are each equal to the length of each sub-pixel.

18. The display device of claim 1, wherein a length of each sub-pixel in the display panel is equal to a width of the sub-pixel; wherein a spacing between every two adjacent first grid lines is equal to a spacing between every two adjacent second grid lines, and wherein both are each equal to a sum of widths of a number of n sub-pixels and widths of a number of (n−1) first grid lines; wherein n is a natural number greater than or equal to 2.

19. The display device as recited in claim 1, wherein a spacing between every two adjacent first grid lines is m times a spacing between every two adjacent second grid lines, m being a natural number greater than 1.

20. A display device, comprising a backlight module and a display panel, the backlight module being configured to provide backlight for the display panel; wherein the backlight module comprises:
   a back plate, comprising a bottom plate;
   a first light plate, disposed on the bottom plate, wherein there is disposed a plurality of first light-emitting elements on the first light plate, and there is defined a hollowed region in a center of the first light plate;
   a first viewing angle control layer, disposed on a side of the first light plate facing away from the bottom plate, wherein the first viewing angle control layer comprises a plurality of first grid lines sequentially arranged along a first orientation; and
   a rotating assembly, arranged in the hollowed region, wherein the rotating assembly comprises a motor and a second light plate, wherein one end of the motor is fixed to the bottom plate, and another end of the motor is a rotating shaft which is arranged perpendicular to the bottom plate and connected to the second light plate so as to control the second light plate to rotate in a direction parallel to a plane in which the display panel lies, wherein the first viewing angle control layer is fixed to the second light plate;
   wherein the display device further comprises a second viewing angle control layer, disposed on a side of the first viewing angle control layer facing away from the bottom plate, wherein the second viewing angle control layer comprises a plurality of second grid lines sequentially arranged along a second orientation;
   wherein an orthogonal projection of the second viewing angle control layer on the bottom plate overlaps with an orthogonal projection of the first viewing angle control layer on the bottom plate; wherein the first viewing angle control layer is disposed on a side of the second light plate facing the display panel and is disposed opposite to a plurality of second light-emitting elements arranged on the second light plate; wherein there is defined in the bottom plate a groove corresponding to the hollowed region; wherein the motor is arranged inside the groove; and wherein the first light plate is flush with the second light plate.

* * * * *